US007369925B2

(12) United States Patent
Morioka et al.

(10) Patent No.: US 7,369,925 B2
(45) Date of Patent: May 6, 2008

(54) VEHICLE FAILURE DIAGNOSIS APPARATUS AND IN-VEHICLE TERMINAL FOR VEHICLE FAILURE DIAGNOSIS

(75) Inventors: Michio Morioka, Ibaraki (JP); Masami Nagano, Ibaraki (JP); Toshimichi Minowa, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 11/184,861

(22) Filed: Jul. 20, 2005

(65) Prior Publication Data

US 2006/0047382 A1 Mar. 2, 2006

(30) Foreign Application Priority Data

Aug. 11, 2004 (JP) ............................ 2004-234231

(51) Int. Cl.
*G01M 17/00* (2006.01)

(52) U.S. Cl. .......................... 701/29; 701/30; 340/438; 340/439

(58) Field of Classification Search .................. 701/29, 701/30, 45; 340/438, 439; 702/182, 183; 706/20
See application file for complete search history.

(56) References Cited

U.S. PATENT DOCUMENTS

| | | | | |
|---|---|---|---|---|
| 5,809,437 | A * | 9/1998 | Breed | 701/29 |
| 6,442,511 | B1 | 8/2002 | Sarangapani et al. | |
| 6,505,106 | B1 | 1/2003 | Lawrence et al. | |
| 6,553,291 | B2 | 4/2003 | Matsui | |
| 2003/0114965 | A1 | 6/2003 | Fiechter et al. | |
| 2003/0216889 | A1* | 11/2003 | Marko et al. | 702/182 |

FOREIGN PATENT DOCUMENTS

| | | |
|---|---|---|
| EP | 1219946 | 7/2002 |
| EP | 1253415 | 10/2002 |
| EP | 1255101 | 11/2002 |
| GB | 2378248 | 2/2003 |
| JP | 2002-202003 | 7/2002 |
| WO | WO 2004/049161 | 6/2004 |

OTHER PUBLICATIONS

European Search Report dated Jan. 18, 2006.

* cited by examiner

*Primary Examiner*—Gertrude A. Jeanglaude
(74) *Attorney, Agent, or Firm*—Crowell & Moring LLP

(57) ABSTRACT

In order to estimate failure times of vehicles, the invention provides a vehicle failure diagnosis apparatus which receives records of learned values actually used in the past in vehicle control systems of vehicles as diagnosis targets from in-vehicle terminals via a communication part, estimates failure time of the vehicle control systems by comparing the received records of the learned values and the failure patterns readout from a failure pattern DB, and outputs the estimated failure time to the in-vehicle terminals.

10 Claims, 10 Drawing Sheets

VEHICLE FAILURE DIAGNOSIS APPARATUS AND IN-VEHICLE TERMINAL FOR VEHICLE FAILURE DIAGNOSIS

BACKGROUND OF THE INVENTION

1. Field of the Invention

The present invention relates to a vehicle failure diagnosis apparatus and an in-vehicle terminal for vehicle failure diagnosis which diagnose failures of vehicles such as automobiles in advance.

2. Description of the Related Art

In a conventional vehicle management system, first, learned values (values obtained through learning operation) of control systems such as the vehicle throttle are accumulated in a database. Then, when the learned values accumulated in the database are out of regulated ranges that indicate normal states of the control systems, it is diagnosed that the control systems with the learned values will fail in the future. Then, the results of diagnosis are transmitted to a user's cellular phone. For example, Japanese laid-open Patent Application No. 2002-202003 (paragraph 0020-0025, FIG. 3) disclose such a technique.

However, the conventional vehicle management system has a problem in that it cannot estimate the failure time although the system diagnoses the failures of the control systems in advance.

Therefore, it is requested to provide a vehicle failure diagnosis apparatus and an in-vehicle terminal which can estimate failure time of vehicles.

SUMMARY OF THE INVENTION

An aspect of the present invention provides a vehicle failure diagnosis apparatus, comprising: a storage device for storing failure patterns that indicate processes until failures of vehicle control systems in time series regarding learned values to be used for compensation of control in the vehicle control systems; a communication part; a record receiving function for receiving records of learned values actually used in the past in the vehicle control systems of vehicles as diagnosis targets from vehicle terminals in the vehicles via the communication part; a failure time estimating function for estimating failure time of the vehicle control systems by comparing the received records of the learned values and the failure patterns readout from the storage device; and an estimation result output function for supplying the estimated failure time to the vehicle terminals.

The vehicle failure diagnosis apparatus may comprise a record receiving function for receiving records of learned values actually used in the past in the vehicle control systems of vehicles as diagnosis targets from vehicle terminals via a communication part. The vehicle failure diagnosis apparatus may comprise a failure time estimating function for estimating failure time (timing (date) or a period from a present time or giving timing such as shipping date) of the vehicle control system by comparing the received learned value records and the failure patterns readout from the storage device. Furthermore, the vehicle failure diagnosis apparatus may comprise an estimation result output function for supplying the estimated failure time to the vehicle terminal.

Another aspect of the present invention provides an in-vehicle terminal comprising: a storage device that stores failure patterns indicating processes until failures of vehicle control systems in time series regarding learned values to be used for compensation of control in the vehicle control systems, and stores records of the learned values actually used in the past in the vehicle control systems of vehicles as a diagnosis targets; a failure time estimating function for estimating failure time of the vehicle control system of one of the vehicles that mounts the in-vehicle terminal by comparing the records of the learned values readout from the storage device with the failure patterns readout from the storage device; and an estimation result output function for externally outputting the estimated failure time.

The in-vehicle terminal may comprise a failure time estimating function for estimating failure time of the vehicle control system by comparing the learned value records readout from the storage device and the failure patterns readout from the storage device. The in-vehicle terminal may comprise an estimation result outputting function for externally outputting the estimated failure time.

A further aspect of the present invention provides an in-vehicle terminal comprising: a storage device that stores estimation criteria data for estimating failure time of a vehicle control system based on changes in learned values to be used for compensating control in the vehicle control system, and stores records of the learned values actually used in the past in the control system; a failure time estimating function for estimating failure time of the vehicle control system from learned value changes in the records of the learned values readout from the storage device by using the estimation criteria data of the storage device, and an estimation result output function for externally outputting the estimated failure time.

The in-vehicle terminal may comprise a failure time estimating function for estimating failure time of vehicle control systems by using the estimation criteria data of the storage device from changes in learned values shown in the records of the learned values readout from the storage device. In addition, the in-vehicle terminal has an estimation result output function for externally outputting the estimated failure time.

According to a still further aspect of the present invention, failure time of vehicles can be estimated.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinafter, best modes for carrying out the invention are described.

First Embodiment

Figure 1:
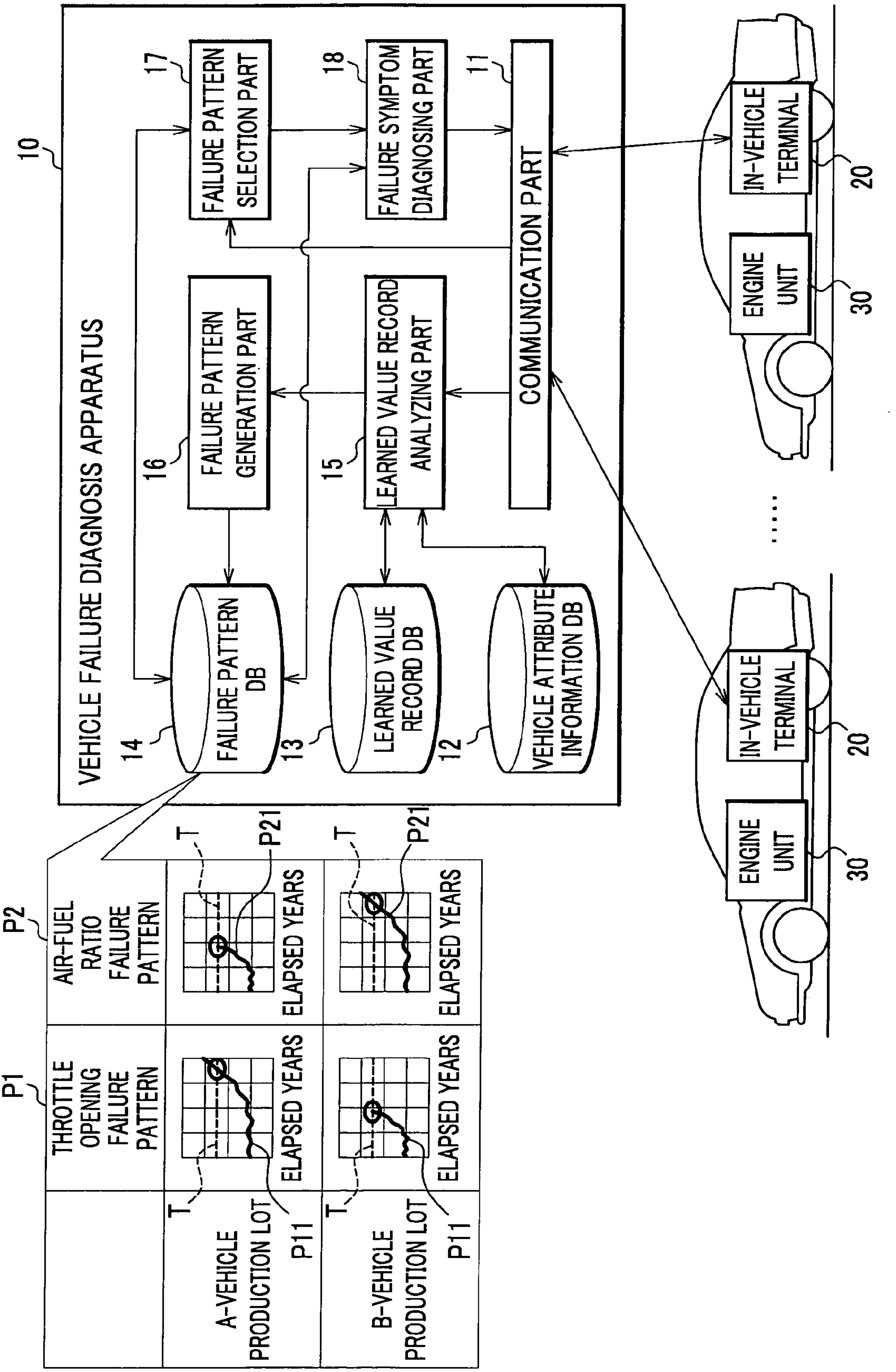
FIG. 1 is a block diagram showing an entire system including a vehicle failure diagnosis apparatus according to a first embodiment of the invention.

FIG. 1 shows a vehicle failure diagnosis apparatus according to a first embodiment of the invention.

In FIG. 1, the vehicle failure diagnosis apparatus 10 performs data communications with a plurality of in-vehicle terminals (vehicle failure diagnosis in-vehicle terminals) 20. Each of in-vehicle terminals 20 controls an engine unit 30. The vehicle failure diagnosis apparatus 10 and the in-vehicle terminals 20 are described in detail.

The vehicle failure diagnosis apparatus 10 includes a communication part 11 such as an input/output interface, a vehicle attribute information DB (storage device) 12, a learned value record DB (storage device) 13, and a failure pattern DB (storage device) 14. "DB" is an abbreviation for database.

In addition, the vehicle failure diagnosis apparatus 10 comprises a learned value record analyzing part 15, a failure pattern generating part 16, a failure pattern selecting part 17, and a failure symptom diagnosing part 18. For example, a computer such as a server is used as the vehicle failure diagnosis apparatus 10. In FIG. 1, a single vehicle failure diagnosis apparatus 10 is shown, however, it is also possible to configure the vehicle failure diagnosis apparatus 10 to carry out distributed processing by using a plurality of computers.

The vehicle attribute information DB 12 stores production related information relating to production of vehicles and usage environmental information of the vehicles based on usage information of the vehicles. For example, the production related information includes vehicle type information, production lot information, and parts information, etc. The vehicle type information is information for identifying vehicle types, and for example, vehicle type codes are used. The production lot information is information for identifying production lots of the vehicles, and for example, production lot numbers or the like are used. The parts information is information for identifying parts such as tires and the like, and for example, parts IDs or the like are used.

In addition, the vehicle usage environmental information is information relating to environments that influence deterioration of the vehicles. For example, this information corresponds to information including a use frequency (high, middle, or low level) and a used area such as a cold district. For example, a mileage record or the like corresponds to this information. Therefore, the vehicle environmental information based on usage information means, for example, a use frequency based on a mileage.

The learned value record DB 13 stores learned value records for each vehicle. The learned values (values obtained through learning operation) are parameters to be used for compensation of vehicle control systems, and for maintaining optimum control statuses of the vehicle control systems. The vehicle control systems are loaded in the above-described engine unit 30. Therefore, the learned values change according to deterioration and aging changes of the engine unit 30.

The records of learned values are records of learned values actually used in the past in the vehicle control systems loaded in the engine unit 30.

The failure pattern DB 14 stores failure patterns of learned values indicating processes until failures of vehicle control systems in time series. The failure patterns are acquired for each kind of learned value.

In FIG. 1, as failure patterns, for example, a throttle opening failure pattern p1 and an air-fuel ratio failure pattern p2 are shown. The throttle opening failure pattern p1 is a failure pattern of throttle opening during idling. The air-fuel ratio failure pattern p2 is a failure pattern of air-fuel ratio controlling. The air-fuel ratio means a mixing ratio of air and gasoline. These failure patterns p1 and p2 are shown for each vehicle type and each production lot.

Then, in the failure patterns p1 and p2, relationships between the elapsed years and months after shipping a vehicle in question and the learned values p11 and p21 are shown. In addition, threshold values T of the learned values p1 and p21 are shown. The threshold values T indicate possibilities of failures. The possibility of failure means necessity of proper repairing or parts replacement. That is, it means that the problem cannot be solved by control based on the learned values.

Furthermore, the failure pattern DB 14 is described in detail. The failure pattern DB 14 sorts (classifies) failure patterns by production related information and stores the sorted failure patterns. In addition, the failure pattern DB 14 stores and sorts failure patterns by usage environmental information.

The learned value record analyzing part 15, the failure pattern generating part 16, the failure pattern selecting part 17, and the failure symptom diagnosing part 18 are provided by operation of, for example, a CPU based on a program. The functions of these parts 16 through 18 are described later.

Next, the in-vehicle terminal 20 is described in detail with reference to FIG. 2.

Figure 2:
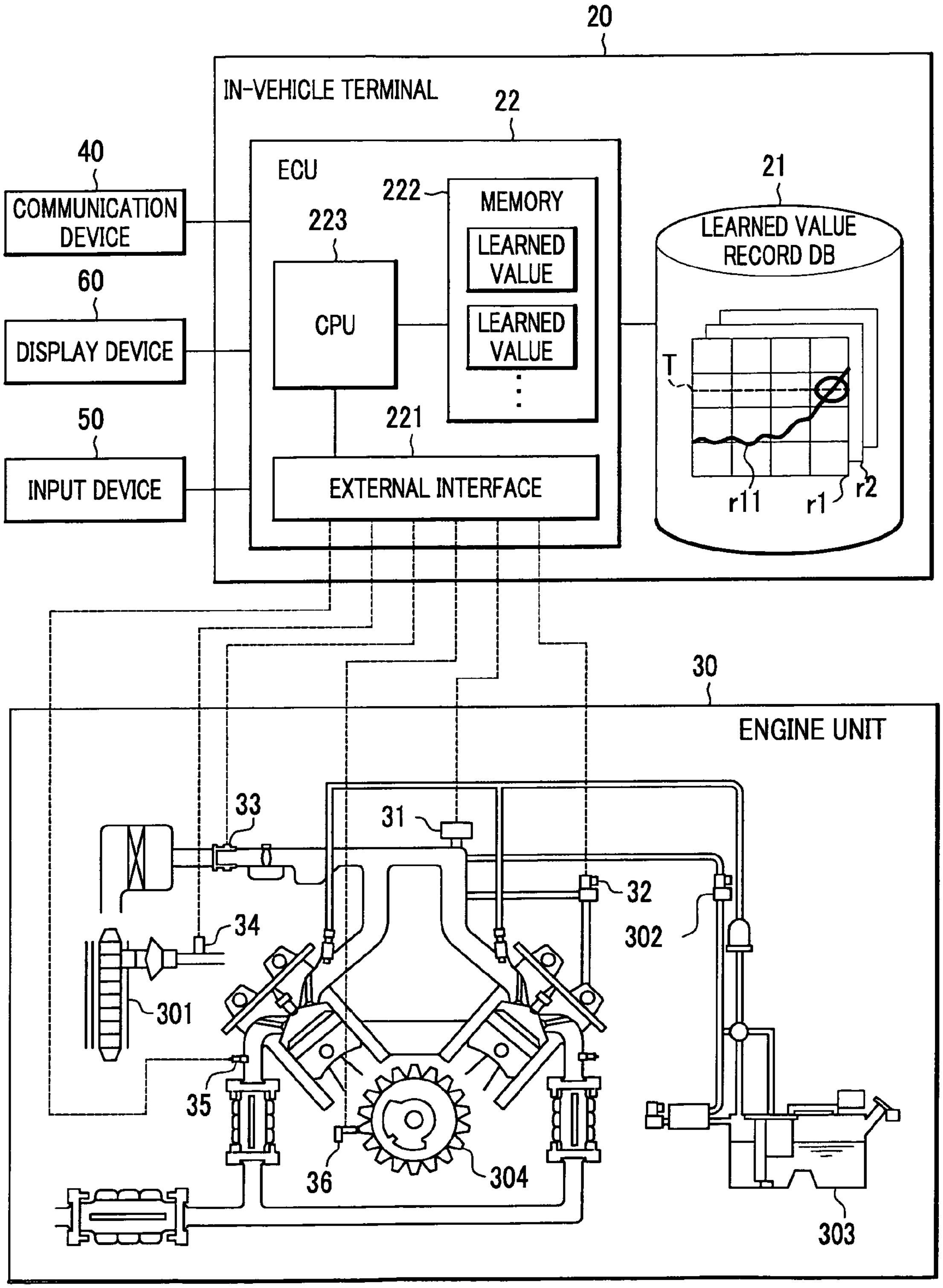
FIG. 2 is a block diagram showing a vehicle side system including an in-vehicle terminal shown in FIG. 1.

FIG. 2 shows a vehicle side system including the in-vehicle terminal. In FIG. 2, the in-vehicle terminal 20 comprises a learned value record DB 21 and an ECU 22. "ECU" is an abbreviation for Electric Control Unit. To the ECU 22, a communication device 40 that communicates with the vehicle failure diagnosis device 10, an input device 50, and a display device 60 are connected.

The communications device 40 comprises an antenna and the like. The input device 50 comprises operation buttons or the like. The display device 60 comprises, for example, a liquid crystal display. These communications device 40, input device 50, and display device 60 are also mounted on the vehicle.

On the ECU 22, an external interface 221 for interfacing with the engine unit 30, a memory 222, and a CPU 223 are mounted. The memory 222 stores various learned values. Records of these various learned values r11 are stored in the learned value record DB 21. In FIG. 2, the learned value record DB 21 is shown independently, however, it may be mounted on the ECU 22.

The engine unit 30 comprises a radiator 301, a purge valve 302, a fuel tank 303, and a detection plate 304. Further the engine unit 30 includes an intake pressure sensor 31, an EGR valve sensor 32, and a throttle opening sensor 33. In addition, this engine unit 30 includes a water temperature sensor 34, an $O^2$ sensor 35, and an engine rotation sensor 36.

The ECU 22 controls actuators (vehicle control system) arranged in the engine unit 30 based on information from sensors 31 through 36 provided in the engine unit 30. For this control, the ECU 22 uses learned values of the memory 222. For example, the fuel injection amount control, the throttle opening control, and the air-fuel ratio adjustment are performed by the ECU 22.

Herein, the method for controlling the throttle opening will be described in detail with reference to FIG. 3.

Figure 3:
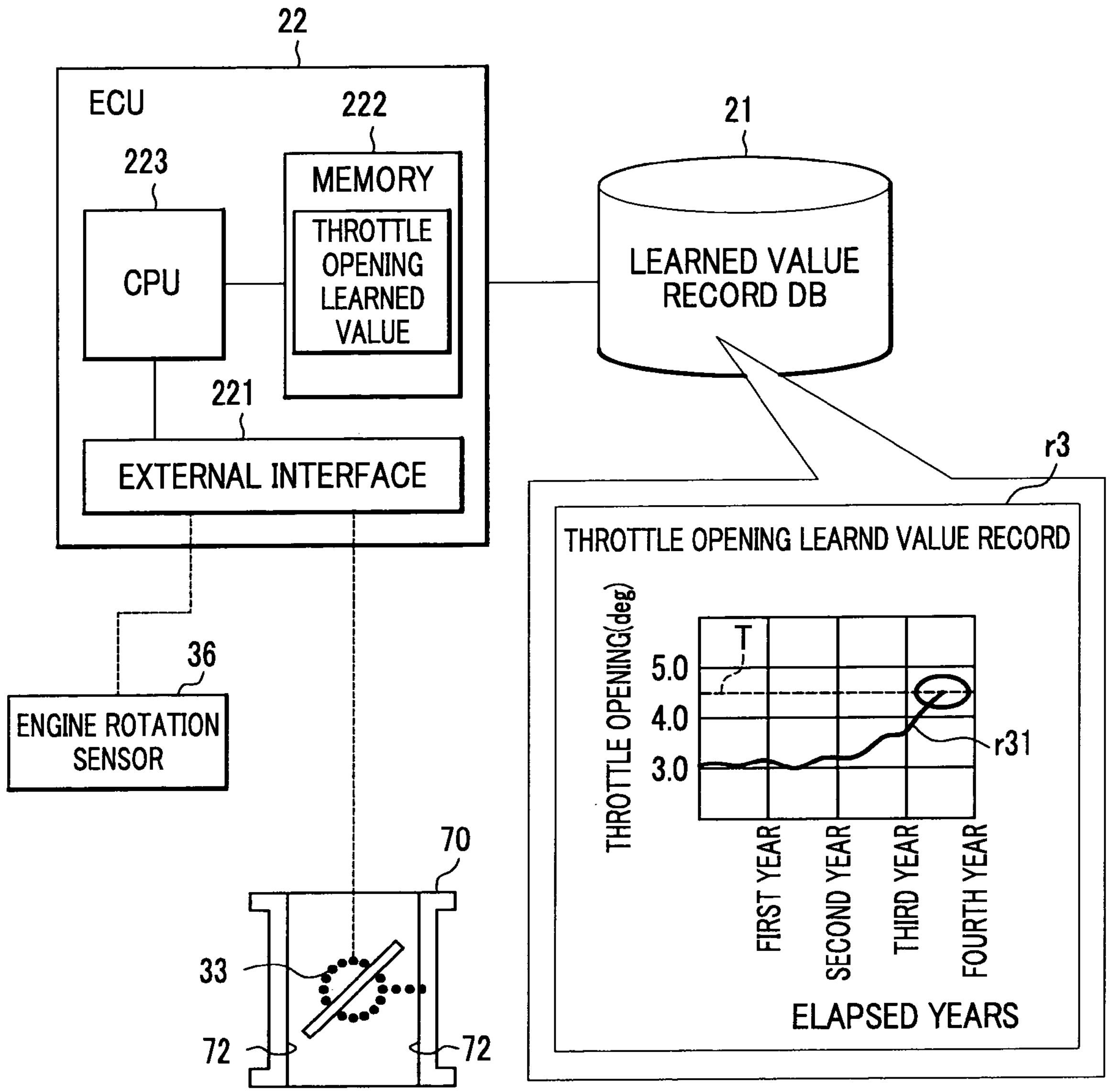
FIG. 3 shows an example of a learned value record registered on the learned value record DB shown in FIG. 1.

FIG. 3 shows the vehicle side system including the ECU and the throttle body 70. In the memory 222 shown in FIG. 3, throttle opening learned values upon idling of the engine are stored. The ECU 22 recalculates the throttle opening learned value based on the information from the throttle opening sensor 33 and the engine rotation sensor 36, and determines the throttle opening.

For example, when carbon 72 begins to adhere to the inside of the throttle body 70 of FIG. 3 due to an abnormality of the engine unit 30, the ECU 22 detects the engine rotation speed (number of revolutions) lowering state based on information from the engine rotation sensor 36. The throttle body 70 controls the amount of air to be fed to the engine. Next, the ECU 22 recalculates and compensates the throttle opening learned value so as to prevent the engine from stopping. As a result, the throttle opening increases, and the engine rotation speed increases. Thus, the ECU 22 adjusts the throttle opening by using the throttle opening learned value.

Then, the throttle opening learned value actually used for adjusting the throttle opening is registered on the learned value record DB 21 for each adjustment until it reaches the threshold T after shipping the vehicle.

The throttle opening learned value records r3 thus registered show the relationship between the "throttle opening" judged from the actually used learned values r31 and the "elapsed years and months", namely, the elapsed years and months since shipment. The process immediately after shipment (since zero elapsed months and years) until the learned value r31 reaches the threshold T (herein, a value indicating a failure of the throttle body 70) is shown in time series.

Next, computer processing for generating the above-described failure patterns based on the records of the learned values of the in-vehicle terminal 20 will be described with reference to FIG. 4.

Figure 4:
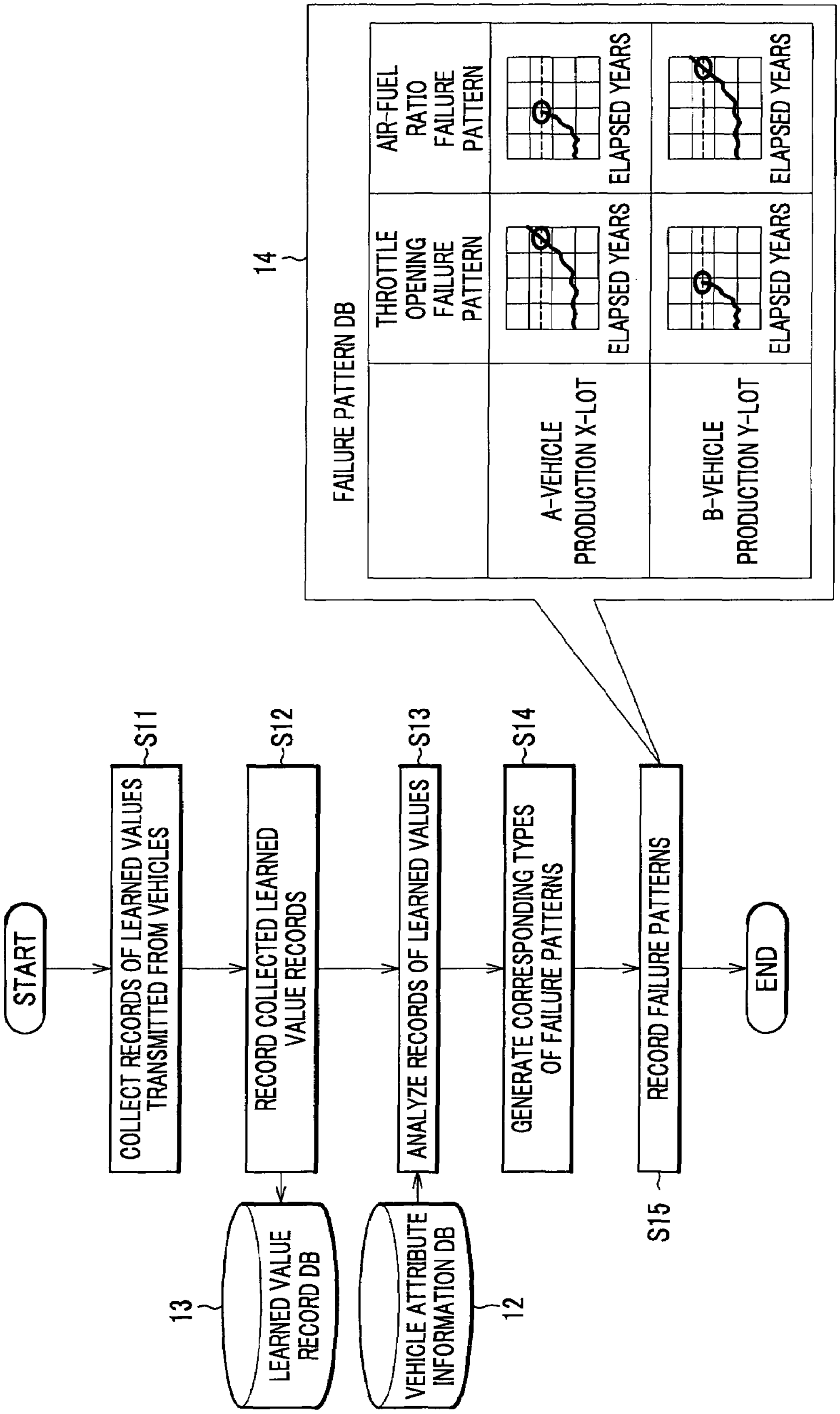
FIG. 4 is a flow chart showing processes for generation of failure patterns in the vehicle diagnosis apparatus shown in FIG. 1.

FIG. 4 shows processes for generation of failure patterns in the vehicle failure diagnosis apparatus. Operations of the vehicle failure diagnosis apparatus 10 are realized by successively executing a pre-installed vehicle failure diagnosis program by the parts 15 through 18. The vehicle failure diagnosis program may be read from a computer readable recording medium. As a recording medium, for example, a CD-ROM, a semiconductor memory, and a magnetic disk are available.

First, each in-vehicle terminal 20 reads out records of learned values from the learned value record DB 21 shown in FIG. 2, and transmits the records to the vehicle failure diagnosis apparatus 10 via the communication device 40. Then, in the vehicle failure diagnosis apparatus 10, the learned value record analyzing part 15 collects the records of learned values transmitted from the vehicles including the in-vehicle terminals 20 via the communication part 11 (S11: these operations are referred to as "record collecting function"). Then, the learned value record analyzing part 15 records the collected learned value records on the learned value record DB 13 (S12). The records are classified and recorded for each vehicle.

Next, the learned value record analyzing part 15 analyzes records of learned values recorded on the learned value record DB 13 (S13). In the analysis of the records, the records are grouped according to the similarities of the records of the learned values. In the analysis of the records, averages of changes (gradients) in learned values with respect to the elapsed years and months are calculated. Thus, the learned value record analyzing part 15 determines corresponding types of failure patterns.

Furthermore, the step S13 will be described in detail. The learned value record analyzing part 15 identifies types of production related information (for example, vehicle type information and production lot information) relating to production of vehicles concerning the records collected in the step S11 from the vehicle attribute information DB 12 (these operations are referred to as "production related information identifying function").

Then, the failure pattern generating part 16 generates corresponding types of failure patterns based on the results of analysis by the learned value record analyzing part 15 in a step S14 (the steps S13 and S14 are also referred to as "failure pattern analyzing function"). Next, the learned value record generating part 16 records the failure patterns generated in the step S14 on the failure pattern DB 14 in a step S15 (referred to as "failure pattern registering function"). The step S15 will be described in detail. When recording failure patterns by the failure pattern registering function provided by the step S15, the learned value record generating part 16 records the failure patterns on the failure pattern DB 14 for each of the production related information identified by the production related information identifying function provided by the step S13. Thereby, on the failure pattern DB 14, for example, two types of failure patterns (of throttle opening and air-fuel ratio) shown in FIG. 4 are recorded. Thus, failure patterns based on the records of the learned values actually used in the past in vehicle control systems of vehicles are recorded on the failure pattern DB 14. This enables estimation of failures of vehicle control systems described later.

Next, computer processing for estimating failures of vehicle control systems based on the above-described failure patterns will be described with reference to FIG. 5.

Figure 5:
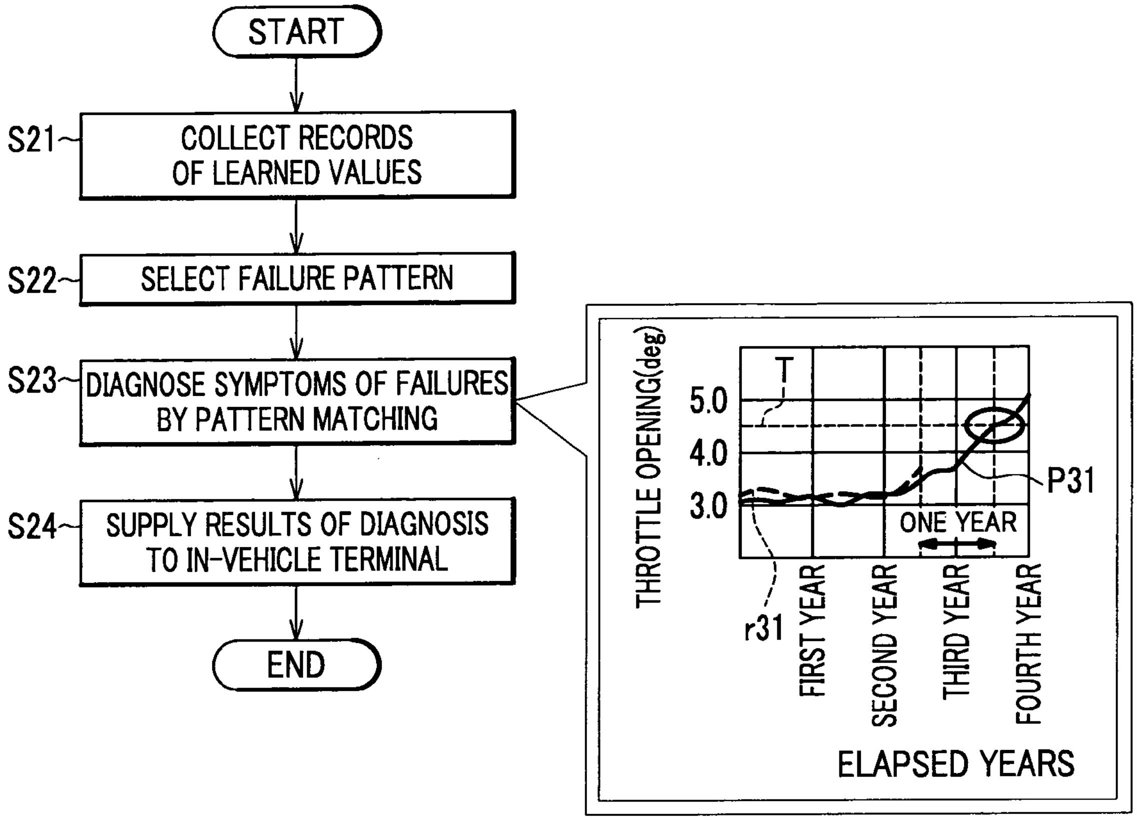
FIG. 5 is a flow chart showing processes for estimating a failure of a vehicle control system in the vehicle failure diagnosis apparatus shown in FIG. 1.

FIG. 5 is a diagram showing processes in the vehicle failure diagnosis apparatus for estimation of failures of vehicle control systems. Herein, a case where the vehicle failure diagnosis apparatus 10 estimates failures of vehicle control systems regarding the throttle opening is described as an example.

First, in-vehicle terminals 20 of vehicles as diagnosis targets read records of learned values (of throttle opening, herein) from the learned value record DB 21 of FIG. 3, and transmit the records to the vehicle failure diagnosis apparatus 10 via communication devices 40. Then, in the vehicle failure diagnosis apparatus 10, the failure pattern selecting part 17 collects (receives) the records of learned values transmitted from the vehicles including the in-vehicle terminals 20 (S21: referred to as "record receiving function") via the communication part 11. After that, the failure pattern selecting part 17 reads out one of failure patterns corresponding to the collected learned value records from the failure pattern DB 14 and selects it in a step S22 (referred to as "failure pattern selecting function"). In detail, the failure pattern selecting part 17 selects the failure pattern corresponding to production related information (for example, vehicle type information and production lot information) relating to production of the vehicles as diagnosis targets.

Next, the failure symptom diagnosing part 18 compares the records of the learned values collected in the step S21 and the failure pattern readout from the failure pattern DB 14, and diagnoses symptoms of failures by means of pattern matching in a step S23 (referred to as "failure time estimating function). Namely, the failure symptom diagnosing part 18 estimates failure time of the vehicle control systems. For example, in FIG. 5, based on the gradient (throttle opening change/elapsed years and months) of the learned value P31 indicated for each failure pattern, it is estimated that the learned value r31 collected in the step S21 will reach the threshold value T one year later. Thereby, the failure time is estimated as one year later.

Then, the failure symptom diagnosing part 18 supplies the results of diagnosis in the step S23, that is, the failure time to the in-vehicle terminals 20 via the communication part 11 in a step S24 (referred to as "estimation result output function"). In response to this, the in-vehicle terminals 20 displays the failure time supplied from the failure symptom diagnosing part 18 on the display devices 60 shown in FIG. 2. Therefore, drivers of the vehicles can grasp the failure time.

Recording Processing of Failure Patterns for Each Piece of Usage Environmental Information Next, recording processing of the failure patterns for each piece of usage environmental information is described based on FIG. 4. The learned value record analyzing part 15 of the vehicle failure diagnosis apparatus 10 of FIG. 1 may execute the following processing after collecting vehicle usage information (for example, mileage, etc.) together with learned value records.

Namely, the learned value record analyzing part 15 reads out usage environmental information (for example, use frequencies or the like) of the vehicles as diagnosis targets from the vehicle attribute information DB 12 based on the usage information collected in the step S11 (referred to as "usage environment determining function"). When recording the failure patterns in the step S15, the failure pattern generating part 16 records the failure patterns on the failure pattern DB 14 by sorting these by vehicle usage environmental information readout by the learned value record analyzing part 15. In this case, for example, it becomes possible to sort the failure patterns by considering usage environments such as use frequencies.

Selection Processing of Failure Patterns for Each Usage Environmental Information Next, a case where failure patterns classified for each usage environmental information and recorded are selected, and failure time of the vehicles is estimated is described based on FIG. 5.

The failure pattern selecting part 17 of the vehicle failure diagnosis apparatus 10 of FIG. 1 may perform the following processing after collecting (receiving) usage information (for example, mileage, etc.) of the vehicles together with the learned value records provided in the step S21 of FIG. 5.

Namely, the failure pattern selecting part 17 selects, in a step S22, one of the failure patterns corresponding to usage environmental information (for example, high use frequency or the like) of the vehicles based on the usage information (for example, mileage, etc.) collected in the step S21 from the failure pattern DB 14. Then, when diagnosing in a step S23, the failure symptom diagnosing part 18 reads out the failure patterns selected by the failure pattern selecting part 17 from the failure pattern DB 14 (these operations are referred to as "usage environment determining function"). The failure symptom diagnosing part 18 estimates failure time by comparing the readout failure patterns and the learned value records collected in the step S21. In this case, it becomes possible that the failure time is estimated by selecting failure patterns for each environment that influences deterioration of the vehicles. Therefore, the certainty in estimation of failure time becomes high.

Second Embodiment

Figure 6:
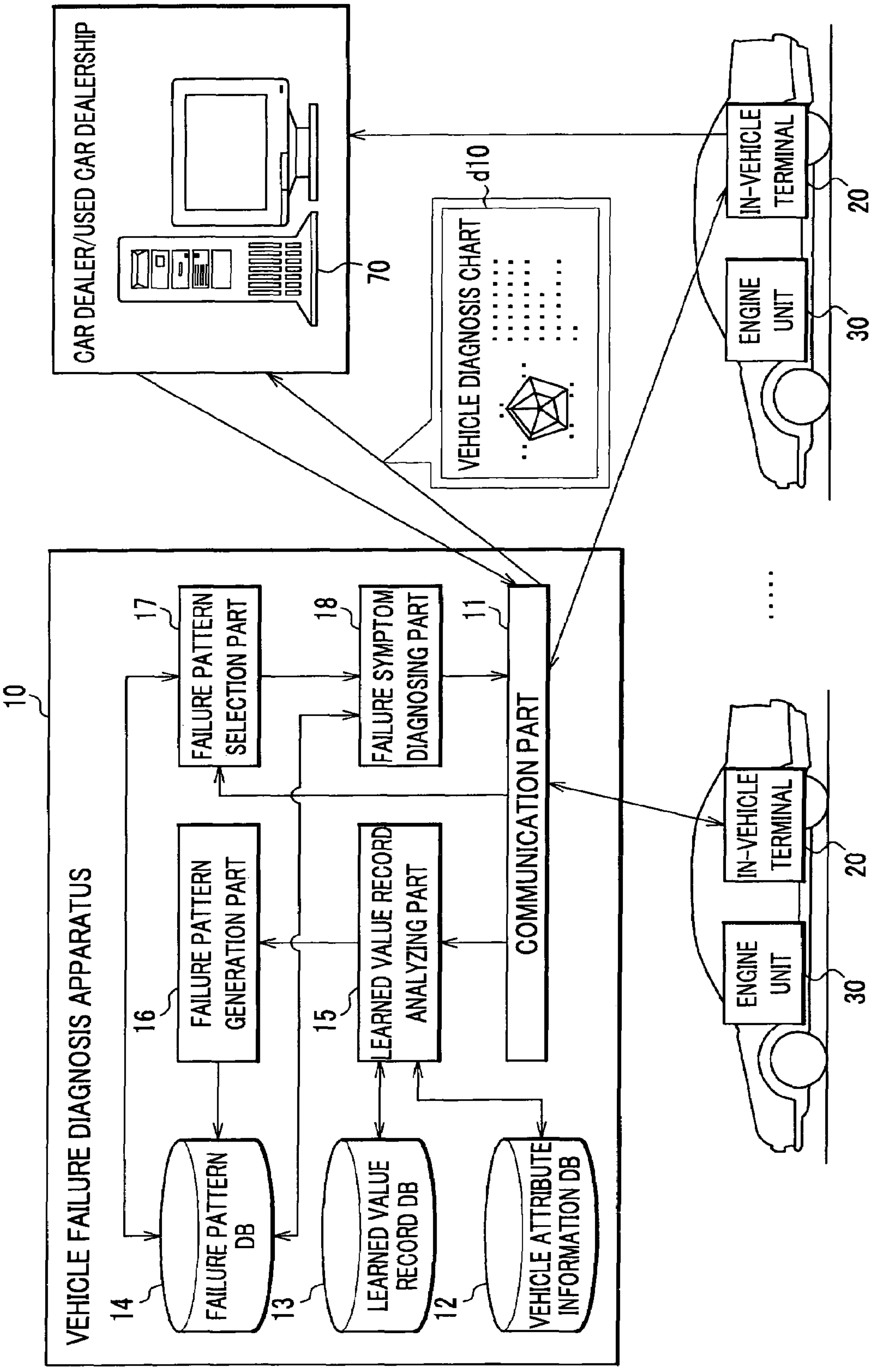
FIG. 6 is a block diagram of an entire system of a second embodiment of the invention.

FIG. 6 shows an entire system according to a second embodiment of the invention. The same parts as those of the first embodiment are attached with the same references as those of the first embodiment, and thus duplicated description is omitted.

The vehicle failure diagnosis apparatus 10 of FIG. 6 is characterized by transmitting the results of diagnosis in the step S23 to the agent terminal 70 using the estimation result outputting function provided in the step S24. The agent terminal 70 comprises a computer such as a personal computer, and is generally constructed as follows. That is, the agent terminal 70 includes an input device such as a keyboard, a display device such as a computer display, a storage device such as a memory, and a processing device such as a CPU. The storage device stores records of learned values recorded on the learned value record DBs 21 (see FIG. 2) mounted on the in-vehicle terminals 20. The learned value records are received and collected from the in-vehicle terminals 20 through a communications network such as a wireless LAN (Local Area Network), however, the method of collecting the records of learned values is not limited to this. The agent terminal 70 is set at a car dealer or a used car dealership.

This system will be described in detail. The agent terminal 70 requests the vehicle failure diagnosis apparatus 10 to diagnose a failure of the vehicle via a communication network such as the Internet in response to the predetermined operation by an agent. Upon this request, the agent terminal 70 transmits the records of learned values readout from the storage device to the vehicle failure diagnosis apparatus 10 through the communications network.

Then, in the vehicle failure diagnosis apparatus 10, processing from the steps S21 to S24 shown in FIG. 5 is performed, and the results of diagnosis are supplied to the agent terminal 70 as a vehicle diagnosis chart d10. An example of this output is shown in FIG. 7.

Figure 7:
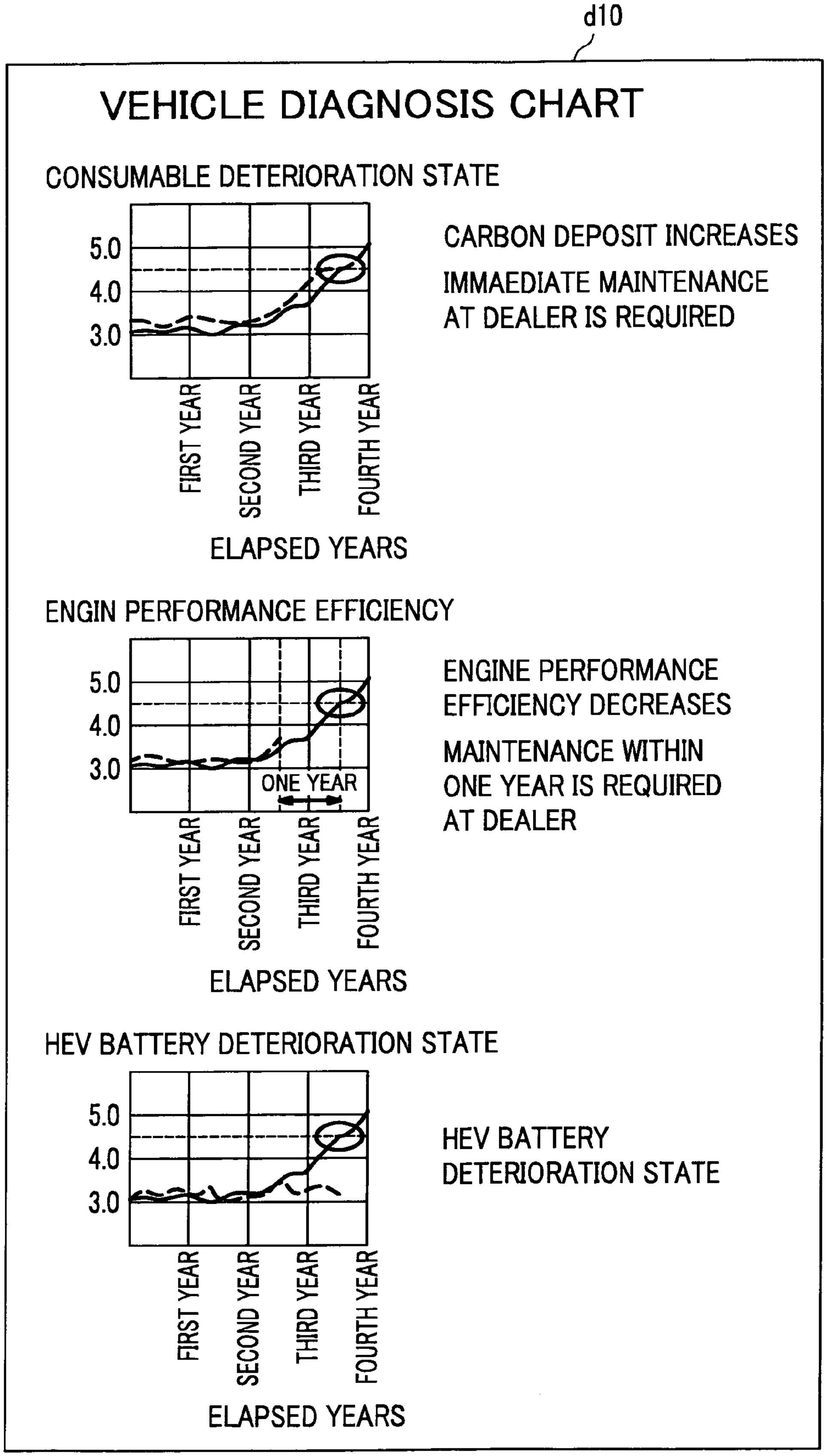
FIG. 7 is an explanatory view showing an example of a vehicle diagnosis chart to be outputted by the vehicle failure diagnosis apparatus of FIG. 6.

In the vehicle diagnosis chart d10 of FIG. 7, three diagnosis items including the consumable deterioration state, the engine performance efficiency, and the HEV (hybrid electric vehicle) battery deterioration state are shown. For each diagnosis item, diagnosis results such as "the HEV battery is normal" is shown. This is useful since this enables the agent to check the consumable deterioration state, engine performance efficiency, and HEV battery deterioration state and confirm a vehicle failure time.

Third Embodiment

Figure 8:
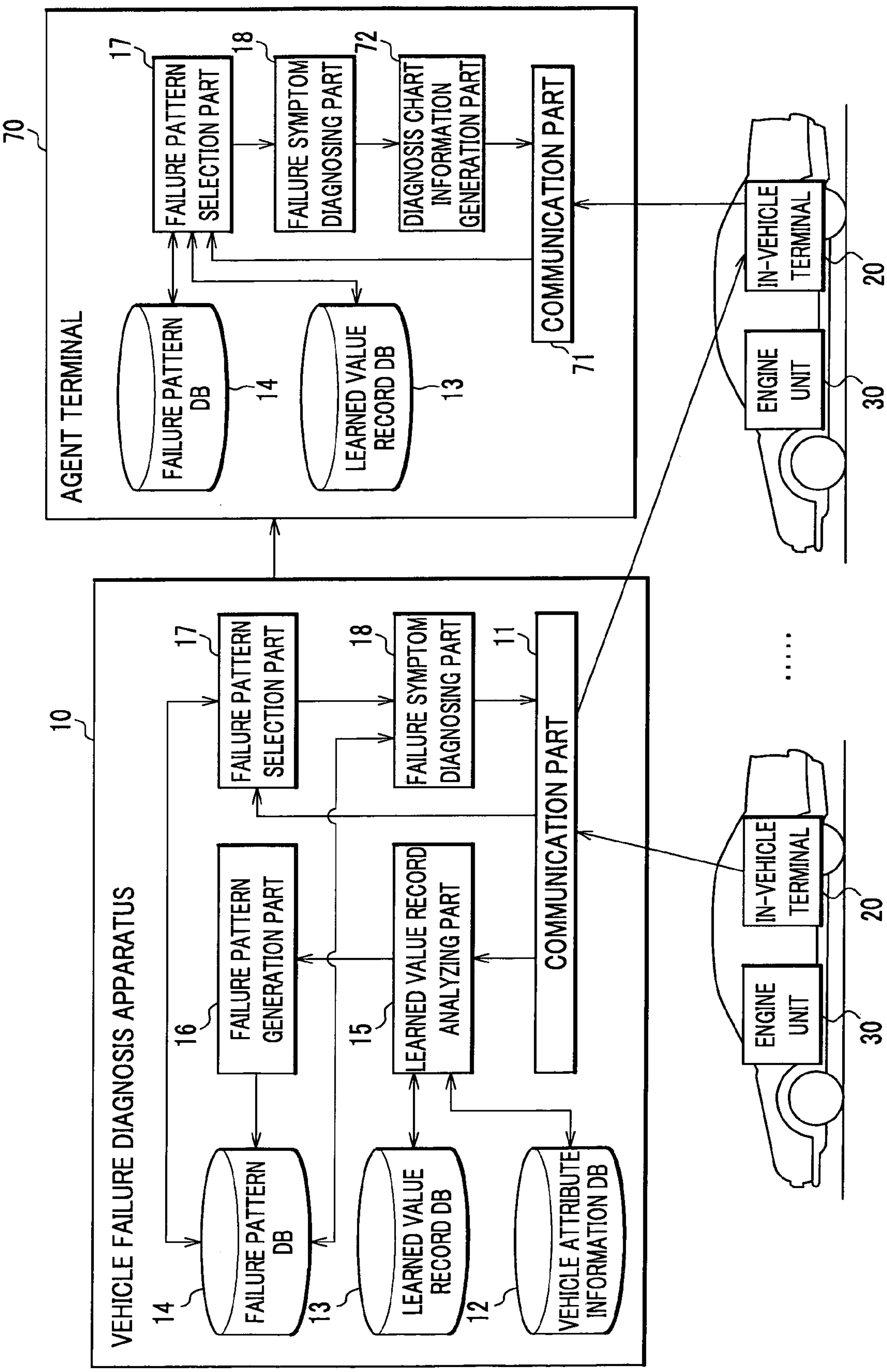
FIG. 8 is a block diagram showing an entire system according to a third embodiment of the invention.

FIG. 8 shows an entire system according to a third embodiment of the invention. The same parts as those of the first and second embodiments are attached with the same references as those of the first and second embodiments, and thus duplicated description is omitted. In the third embodiment, as shown in FIG. 8, the agent terminal 70 is constructed as follows. Namely, the agent terminal 70 includes a learned value record DB 13, a failure pattern DB 14, a failure pattern selecting part 17, and a failure symptom diagnosing part 18 of the vehicle failure diagnosis apparatus 10. The agent terminal 70 comprises a communication part 71 that communicates with in-vehicle terminals 20 and a diagnosis chart information generating part 72.

This configuration provides, in the agent terminal 70, the record receiving function, the failure pattern selecting function, the failure time estimating function, and the estimation result output function of the vehicle failure diagnosis apparatus 10 described in FIG. 5. Therefore, the agent terminal 70 can perform processing from the steps S21 to S24 of FIG. 5 and estimate failure time of vehicle control systems of vehicles as diagnosis targets.

The agent terminal 70 of FIG. 8 includes a diagnosis chart information generating part 72, so that the agent terminal 70 of FIG. 8 is also provided with the following function by the diagnosis chart information generating part 72. Namely, the agent terminal 70 generates, for example, the vehicle diagnosis chart d10 shown in FIG. 7 by using the diagnosis results of the failure symptom diagnosing part 18 by the diagnosis chart information generating part 72. Then, the agent terminal 70 supplies the vehicle diagnosis chart d10 of FIG. 7 to the in-vehicle terminal 20 via the communication part 71 by the diagnosis chart information generating part 72.

Thereby, the in-vehicle terminal 20 supplies the vehicle diagnosis chart d10 of FIG. 7 to the display device 60 (see FIG. 2). Therefore, the driver of the vehicle can check the vehicle diagnosis chart d10 of FIG. 6 on the display device 60.

Fourth Embodiment

Figure 9:
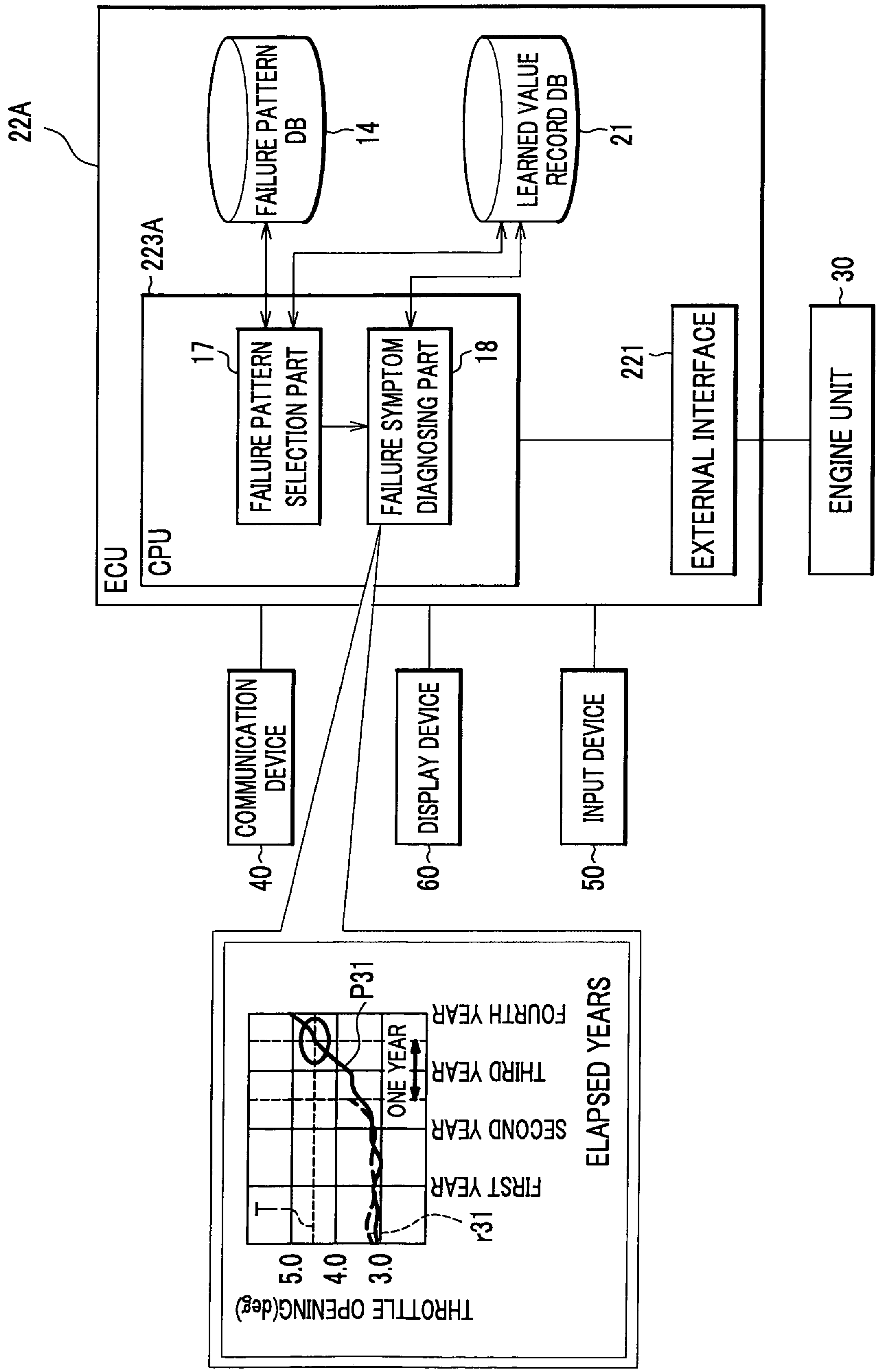
FIG. 9 is a block diagram showing an in-vehicle terminal according to a fourth embodiment of the invention.

FIG. 9 shows an in-vehicle terminal according to a fourth embodiment of the invention. The same parts as those of the first embodiment are attached with the same references as those of the first embodiment, and thus duplicated description is omitted.

In the fourth embodiment, differently from the case of the in-vehicle terminal 20 of FIG. 2, the ECU 22A is shown as an in-vehicle terminal. Further, differently from the case of the in-vehicle terminal of FIG. 2, on the CPU 223A mounted on the ECU 22A, the failure pattern DB 14, the failure pattern selecting part 17, and the failure symptom diagnosing part 18 shown in FIG. 1 are mounted.

This configuration provides, in the ECU 22A, the failure pattern selecting function, the failure time estimating function, and the estimation result output function of the vehicle failure diagnosis apparatus 10 described in FIG. 5. Therefore, the agent terminal 70 can perform processing from the steps S21 to S24 of FIG. 5 and estimate failure time of vehicle control systems of vehicles as diagnosis targets. In this case, the ECU 22A displays a failure time diagnosed by the failure time estimating function on the display device 60 in predetermined timing (set in advance) by the estimation result output function. For example, as shown in FIG. 9, on the display device 60, a failure time (one year later) of the vehicle estimated based on the throttle opening learned value r31 is displayed.

With this construction, the driver of the vehicle can also grasp the vehicle failure time as in the case of the first embodiment. The ECU 22A is also provided with the usage environment determining function of the vehicle failure diagnosis apparatus 10 of FIG. 1.

Fifth Embodiment

Figure 10:
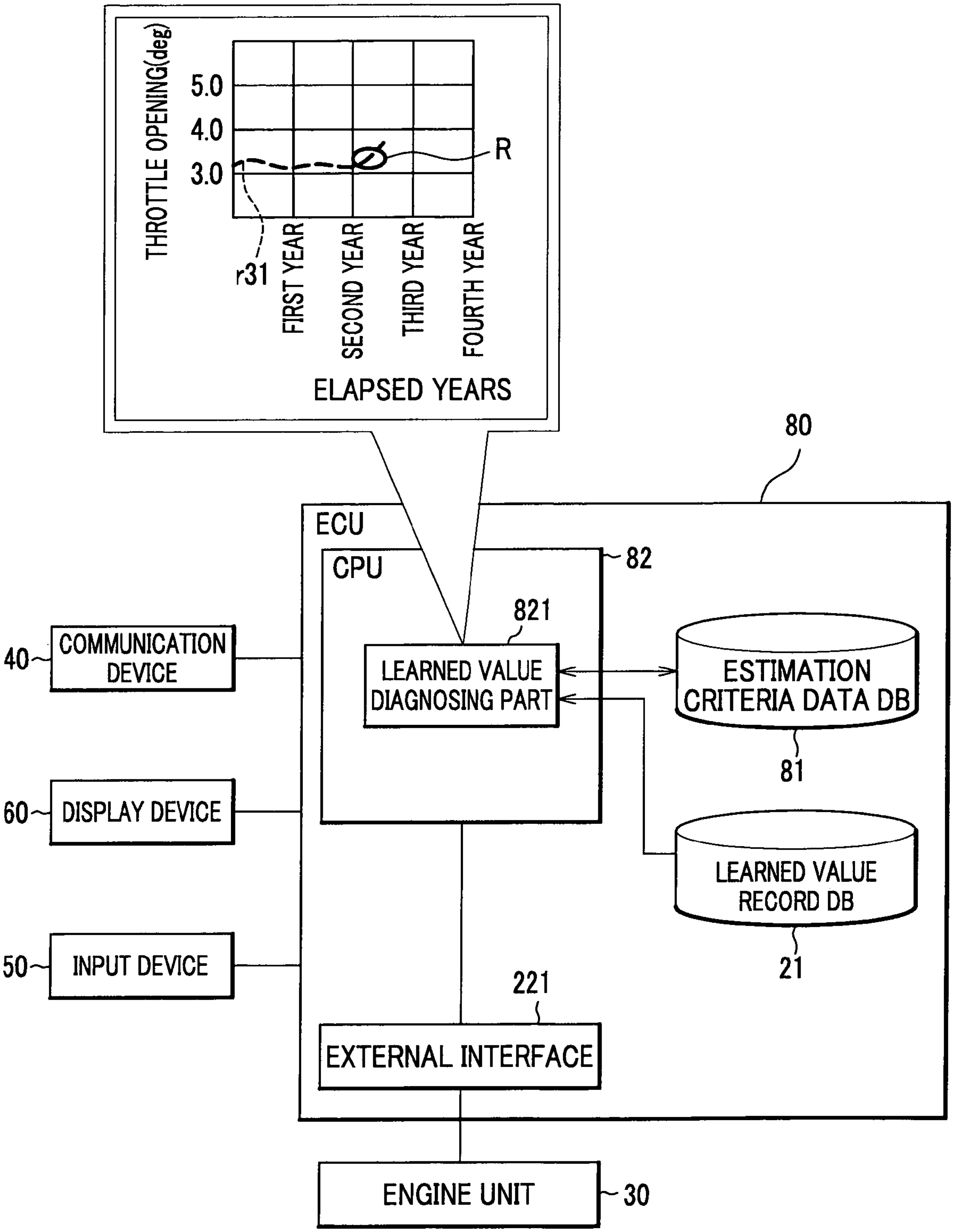
FIG. 10 is a block diagram showing an in-vehicle terminal according to a fifth embodiment of the invention.

FIG. 10 shows an in-vehicle terminal according to a fifth embodiment of the invention. The same parts as those of the first and fourth embodiments are attached with the same references as those of the first and fourth embodiments, and thus duplicated description is omitted.

In the fifth embodiment, the ECU 80 is shown as an in-vehicle terminal. Then, on the ECU 80, in place of the failure pattern DB 14 mounted on the ECU 22A and the CPU 223A of FIG. 9, an estimation criteria data DB (storage device) 81 and a CPU 82 are mounted.

The estimation criteria data DB 81 stores estimation criteria data for estimating a failure time of a vehicle control system inside the engine unit 30. The estimation criteria data is set based on changes (gradient) in the learned value. Namely, correspondence between changes in learned values and failure time are set in the estimation criteria data. For example, the estimation criteria data is set so that the failure time becomes earlier as the change becomes greater.

The ECU 80 includes a learned value diagnosing part 821. The learned value diagnosing part 821 reads out records of the learned value r31 from the learned value record DB 21. In addition, the learned value diagnosing part 821 reads out the estimation criteria data from the learned value record DB 21. Then, the learned value diagnosing part 821 estimates failure time of the vehicle control system by using the estimation criteria data from the changes in the learned value r31 shown by the records of the learned value r31 (these operations are referred to as "failure time estimating function"). For example, time (for example, one year later) corresponding to the changes in the learned value in the focused range R shown in FIG. 10 is indicated as failure time.

Then, the learned value diagnosing part 821 displays the failure time estimated by the failure time estimating function on the display device 60 as an external output (these operations are referred to as "estimation result output function").

Thereby, the driver of the vehicle can estimate and predict the failure time of the vehicle through the display device 60.

The invention is not limited to the embodiments 1 through 5 described above. The data structures of DBs 12 through 14 and 21 and the order of program processing can be modified.

The invention claimed is:

1. A vehicle failure diagnosis apparatus, comprising:

a storage device for storing failure patterns that are variation processes of learned values until failures of vehicle control systems in time series, the learned values being parameters used for compensation of control in the vehicle control systems to maintain the vehicle control system in an optimum control state;

a communication part;

a record receiving function for receiving records of learned values actually used in the past in the vehicle control systems of vehicles as diagnosis targets from vehicle terminals in the vehicles via the communication part;

a failure time estimating function for estimating future failure time of the vehicle control systems by comparing the received records of the learned values and the failure patterns readout from the storage device, wherein time when the learned value of the received record reaches a predetermined threshold indicating a possibility of a failure of the vehicle control systems is estimated as the future failure time on the basis of a gradient of the learned value of the failure pattern; and an estimation result output function for supplying the estimated future failure time to the vehicle terminals.

2. The vehicle failure diagnosis apparatus according to claim 1, wherein the storage device stores and sorts the failure patterns by production related information relating to vehicle production of the vehicle control systems, the vehicle failure diagnosis apparatus further comprising a failure pattern selecting function for selecting one of the failure patterns that corresponds to production related information of the vehicle of the diagnosis target from the storage device, and wherein when the failure time estimating function estimates the failure time, the failure time estimating function reads out the one of the failure patterns selected by the failure pattern selecting function from the storage device and carries out estimation by comparing the records of the learned values collected by the learned value collecting function with the one of the failure pattern selected by the failure pattern selecting function.

3. The vehicle failure diagnosis apparatus according to claim 1, wherein the storage device further stores vehicle usage environmental information based on usage information of the vehicles, and stores and sorts the failure patterns by the vehicle usage environmental information of the vehicles, and the vehicle failure diagnosis apparatus further comprises:

a usage environment determining function for, when the record receiving function receives usage information of the vehicles together with the records of the learned values, reading usage environmental information of the vehicle as the diagnosis target from the storage device based on usage information, and a failure pattern selecting function for selecting one of the failure patterns corresponding to the readout usage environmental information from the storage device, and wherein when estimating failure time by the failure time estimating function, the failure time estimating function reads out one selected by the failure pattern selecting function from the failure patterns in the storage device, and carries out estimation by comparing the one of readout failure patterns and the records of the learned values collected by the learned value collecting function.

4. The vehicle failure diagnosis apparatus according to claim 1, further comprising:

a record collecting function for collecting records of the learned values actually used in the past in the vehicle control systems from communication devices of a plurality of vehicle terminals, respectively;

a failure pattern analyzing function for analyzing the failure patterns based on the collected records of the learned values, and a failure pattern registering function for recording the analyzed failure patterns on the storage device.

5. The vehicle failure diagnosis apparatus according to claim 4, wherein the storage device further stores production related information relating to production of the vehicles, and the vehicle failure diagnosis apparatus further comprises a production related information identifying function for identifying production related information relating to production of each vehicle concerning the records collected by the record collecting function from the storage device, and when recording failure patterns, the failure pattern registering function records failure patterns analyzed by the failure pattern analyzing function on the storage device for each of the identified production related information.

6. The vehicle failure diagnosis apparatus according to claim 4, further comprising a usage environment determining function for, when the record receiving function receives usage information of the vehicles together with the records of the learned values,reading usage environmental information of the vehicle as the diagnosis target from the storage device based on usage information, wherein when the record collecting function further collects vehicle usage information together with the records of the learned values, the usage environment determining function reads out the usage environmental information of the vehicle as the diagnosis target based on collected usage information from the storage device, and when recording failure patterns, the failure pattern registering function records failure patterns analyzed by the failure pattern analyzing function on the storage device for each of the readout vehicle usage environmental information.

7. An in-vehicle terminal comprising:

a storage device that stores failure patterns that are variation processes of the learned values until failures of vehicle control systems in time series, the learned values being parameters used for compensation of control in the vehicle control systems to maintain the vehicle control system in an optimum control state, and stores records of the learned values actually used in the past in the vehicle control systems of vehicles as diagnosis targets;

a failure time estimating function for estimating future failure time of the vehicle control system of one of the vehicles that mounts the in-vehicle terminal by comparing the records of the learned values readout from the storage device with the failure patterns readout from the storage device, wherein time when the learned value of the received record reaches a predetermined threshold indicating a possibility of a failure of the vehicle control systems is estimated as the future failure time on the basis of a gradient of the learned value of the failure pattern; and an estimation result output function for externally outputting the estimated future failure time.

8. The in-vehicle terminal according to claim 7, wherein the storage device stores and sorts the failure patterns by production related information relating to vehicle production of the vehicle control systems, and the in-vehicle terminal further comprises a failure pattern selecting function for selecting one of the failure patterns corresponding to the production related information in question from the storage device, and when estimating failure time, the failure time estimating function reads out the one of the failure patterns selected by the failure pattern selecting function from the storage device and carries out estimation by comparing the one of the readout failure patterns and the readout records of the learned values.

9. The in-vehicle terminal according to claim 7, wherein the storage device further stores vehicle usage environmental information based on vehicle usage information of the vehicle control systems, and stores and sorts the failure patterns by the vehicle usage environmental information, and the in-vehicle terminal further comprises a usage environment determining function for reading vehicle usage environmental information based on corresponding vehicle usage information from the storage device, and a failure pattern selecting function for selecting one of the failure patterns corresponding to the determined usage environmental information from the storage device, and when estimating failure time, the failure time estimating function reads out the one of the failure patterns selected by the failure pattern selecting function from the storage device, and carries out estimation by comparing the one of the readout failure patterns and the readout records of the learned values.

10. An in-vehicle terminal comprising:

a storage device that stores estimation criteria data for estimating failure time of a vehicle control system based on changes in learned values that are parameters used for compensating control in the vehicle control system to maintain the vehicle control system in an optimum control state, and stores records of the learned values actually used in the past in the control system;

a failure time estimating function for estimating future failure time of the vehicle control system on the basis of learned value changes in the records of the learned values readout from the storage device and the estimation criteria data in the storage device, and an estimation result output function for externally outputting the estimated future failure time.

* * * * *